(12) United States Patent
Yamauchi et al.

(10) Patent No.: US 10,239,428 B2
(45) Date of Patent: Mar. 26, 2019

(54) VEHICLE SEAT

(71) Applicant: TACHI-S CO., LTD., Akishima-shi, Tokyo (JP)

(72) Inventors: Keigo Yamauchi, Tokyo (JP); Kouichi Moroi, Tokyo (JP); Hitoshi Abe, Tokyo (JP); Kengo Kataoka, Tokyo (JP); Makoto Nomura, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/602,153

(22) Filed: May 23, 2017

(65) Prior Publication Data

US 2018/0001808 A1 Jan. 4, 2018

(30) Foreign Application Priority Data

Jun. 30, 2016 (JP) ................... 2016-130234

(51) Int. Cl.
 A47C 7/02 (2006.01)
 B60N 2/58 (2006.01)
 B60N 2/64 (2006.01)
 B60N 2/28 (2006.01)

(52) U.S. Cl.
 CPC ............. *B60N 2/5883* (2013.01); *B60N 2/64* (2013.01); *B60N 2/28* (2013.01)

(58) Field of Classification Search
 CPC .......... B60N 2/64; B60N 2/5883; B60N 2/28; B60N 2/2803; B60N 2/2887
 USPC ...................................... 297/452.58, 452.56
 See application file for complete search history.

(56) References Cited

U.S. PATENT DOCUMENTS

| | | | | |
|---|---|---|---|---|
| 3,912,328 | A * | 10/1975 | Tanaka ................. | B60R 22/105 24/196 |
| 6,428,099 | B1 * | 8/2002 | Kain .................... | B60N 2/2806 297/250.1 |
| 8,197,010 | B2 * | 6/2012 | Galbreath ............ | B60N 2/5825 297/218.2 |
| 8,690,252 | B2 * | 4/2014 | Noguchi ............... | B60N 2/002 297/391 |
| 8,690,257 | B2 * | 4/2014 | Stiller .................. | B60N 2/5825 24/297 |
| 9,340,128 | B2 * | 5/2016 | Arai ..................... | B60N 2/2887 |
| 9,725,017 | B2 * | 8/2017 | Imayou ................ | B60N 2/5816 |
| 10,011,206 | B2 * | 7/2018 | Fujii .................... | B60N 2/90 |
| 2008/0258523 | A1 * | 10/2008 | Santin ................. | B60N 2/5825 297/218.2 |
| 2012/0261958 | A1 * | 10/2012 | Hutchinson ......... | B60N 2/2806 297/250.1 |
| 2015/0165946 | A1 * | 6/2015 | Taguchi ............... | A47C 31/02 297/452.42 |

(Continued)

FOREIGN PATENT DOCUMENTS

JP 2010-155516 A 7/2010

*Primary Examiner* — Chi Q Nguyen
(74) *Attorney, Agent, or Firm* — Shapiro, Gabor and Rosenberger, PLLC

(57) ABSTRACT

The vehicle seat is configured to improve child seat mountability, and to prevent deterioration in appearance design when the child seat is demounted. The vehicle seat includes an anchor storage recess formed in a pad that constitutes the seat for storing an anchor to be engaged with an engagement member attached to a child seat. The anchor storage recess is covered with a skin material having a slit. The slit has an inverse T-like shape.

13 Claims, 2 Drawing Sheets

(56) References Cited

U.S. PATENT DOCUMENTS

2017/0113588 A1* 4/2017 Ochiai ................ B60N 2/5883
2018/0022245 A1* 1/2018 Fujii ....................... B60N 2/58
297/463.1

* cited by examiner

VEHICLE SEAT

CLAIM OF PRIORITY

The present application claims priority from Japanese Patent application serial No. 2016-130234, filed on Jun. 30, 2016, the content of which is hereby incorporated by reference into this application.

FIELD

The present invention relates to a vehicle seat having an anchor for holding a child seat.

BACKGROUND

International Standard ISO-FIX has been established, specifying the method for fixing the child seat to the vehicle seat. Japanese Patent Application Laid-Open No. 2010-155516 (Patent Literature 1) discloses background art of the vehicle seat configured to store ISO-FIX compatible anchor capable of fixing the ISO-FIX type child seat. The vehicle seat disclosed in Patent Literature 1 has been made to accomplish the task of improving the child seat mountability without deteriorating seating feel when the child seat is demounted. The vehicle seat has an anchor member to be engaged with a fixture of the child seat, which is disposed at the back side of the seat main body constituted by the pad material and the skin material for covering the outer side of the pad material, a through path extending from the front surface to the anchor member, and the slit formed in the skin material at the front surface side of an insertion opening of the through path. The above-described vehicle seat includes an extension member provided for the slit, extending to the region outside the insertion opening.

CITATION LIST

Patent Literature

PTL 1: Japanese Patent Application Laid-Open No. 2010-155516

SUMMARY

Technical Problem

Patent Literature 1 discloses the extension member attached to the slit of the skin material, which extends to the region outside the insertion opening of the pad material. This allows easy insertion of the fixture of the child seat into the through path of the pad material while widely expanding the slit upon mounting of the child seat without deteriorating the seating feel when the child seat is demounted. Upper and lower sides, and both outer sides of two slit-forming skin materials with respect to the slit are sewn to the skin material on the rectangular frame-like sewing part so as to form the slit in the skin material. As the rectangular frame-like sewing part regulates displacement of the peripheral region of the slit, provision of the extension member is still insufficient to accomplish the required child seat mountability.

In view of the aforementioned problem, it is an object of the present invention to provide a vehicle seat which allows improved child seat mountability, and prevents deterioration in the appearance design when the child seat is demounted.

Solution to Problem

The present invention may be exemplified as below.

The vehicle seat includes an anchor storage recess formed in a pad that constitutes the seat for storing an anchor to be engaged with an engagement member attached to a child seat. The anchor storage recess is covered with a skin material having a slit. The slit has an inverse T-like shape.

Advantageous Effects of Invention

The present invention ensures to provide the vehicle seat which allows improved child seat mountability, and to prevent deterioration in the appearance design when the child seat is demounted.

DETAILED DESCRIPTION

Figure 1:
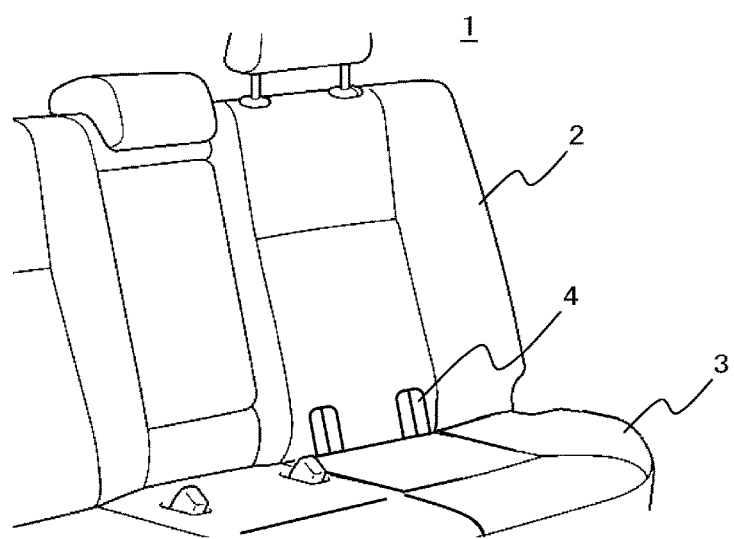
FIG. 1 is a perspective view schematically showing a vehicle seat according to a first embodiment.

Embodiments according to the present invention will be described as below referring to the drawings.

First Embodiment

FIG. 1 is a schematic perspective view of a vehicle seat according to the embodiment. Referring to FIG. 1, a vehicle seat 1 includes a seat back 2, a seat cushion 3, and an anchor to be engaged with the engagement member of the child seat for fixing the ISO-FIX type child seat compatible to International Standard ISO-FIX specifying the method for fixing the child seat to the vehicle seat 1. The vehicle seat further includes an insertion part 4 for storing the anchor and accommodating insertion of the engagement member of the child seat at the lower side of the seat back 2. Upon mounting of the child seat on the front surface of the seat back 2 and the seat cushion 3, the engagement member of the child seat is brought into engagement with the anchor via the insertion part 4. The insertion part 4 may be disposed at the rear end of the seat cushion 3.

Figure 2A:
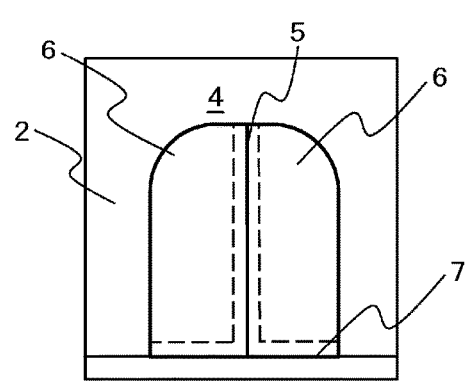
FIGS. 2A and 2B are an enlarged schematic view showing a peripheral part of an insertion part of a seat back according to the first embodiment.
Figure 2B:
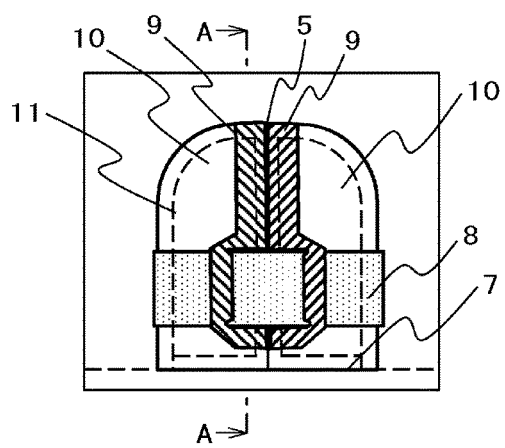

FIGS. 2A and 2B are an enlarged view schematically showing a peripheral part of the insertion part of the seat back. FIG. 2A is a surface view when seen from the surface of the seat back 2, and FIG. 2B is a back view when seen from the back surface of the skin of the seat back 2. Referring to FIG. 2A, the seat back 2 is constituted by covering a mold pad as a foamed pad produced through molding with such wadding as urethane, and the skin material. The insertion part 4 includes a slit 5 formed by two slit-forming skin materials 6. The upper sides and outer sides with respect to the slit 5 of the slit-forming skin materials 6 are sewn to the peripheral part of the skin material. The respective sides of the slit-forming skin materials 6 along the slit 5, and a lower end 7 of the insertion part 4 are not sewn to the peripheral part of the skin material. Namely, the two slit-forming skin materials 6 are sewn, each forming L-like shape so that the slit 5 and the lower end 7 of the insertion part 4 are kept opened. In other words, the insertion part 4 has an inverse T-shaped slit.

Upon insertion of the engagement member of the child seat, two sides of the respective two slit-forming skin materials 6 of the insertion part 4 may be kept opened. This makes it possible to ensure improved child seat mountability with less insertion force.

When pulling out the inserted engagement member of the child seat for the purpose of demounting, the slit-forming skin material 6 may fail to return to its original position in spite of its flexible property, and may possibly reveal the inside of the insertion part 4. The structure aimed at solving such problem will be described below.

Referring to FIG. 2B, a code number 8 denotes a contractile rubber band as an elastic member, a code number 9 denotes a guide member, a code number 10 denotes a slit-forming wadding to be covered with the slit-forming skin material 6, and a code number 11 is a sewing part.

As described above, the two slit-forming skin materials 6 have the upper sides and the outer sides with respect to the slit 5 sewn to the peripheral part of the skin material on the sewing part 11 together with the slit-forming wadding 10. The rubber band 8 is sewn to the respective outer sides of the two slit-forming skin materials 6 with respect to the slit 5 on the sewing part 11. The two guide members 9 are sewn together with the respective slit-forming skin material 6 and the slit-forming wadding 10 on the sewing part 11 while being kept movable through the rubber band 8.

The guide member 9 serves to prevent vertical motion of the rubber band 8 and the slit-forming skin material 6, and to regulate the slit-forming skin material 6 so as not to move outward from the surface of the seat back 2.

Figure 3:
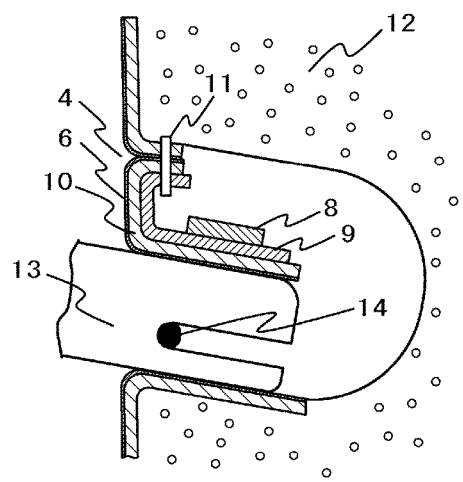
FIG. 3 is a sectional view schematically showing the state where an engagement member of a child seat is inserted into the insertion part according to the first embodiment.

FIG. 3 is a sectional view schematically showing the state where the engagement member of the child seat is inserted into the insertion part 4. FIG. 3 is a sectional view taken along line A-A of FIG. 2B in the state where the engagement member of the child seat is inserted. As FIG. 3 shows, the insertion part 4 is configured to cover an anchor storage recess formed in a mold pad 12 for storing an anchor 14. Upon insertion of an engagement member 13 of the child seat into the insertion part 4, two sides of the respective two slit-forming skin materials 6 are kept opened, and partially put into the insertion part 4. As a result, the engagement member 13 is brought into engagement with the anchor 14. At this time, the rubber band 8 is pulled, and put into the insertion part 4 by the engagement member 13. Meanwhile, in the case where the engagement member 13 is pulled out from the insertion part 4 for disengagement from the anchor 14, elastic force of the rubber band 8 serves to return the slit-forming skin material 6 to the original position via the guide member 9. This makes it possible to prevent deterioration in the appearance design when the child seat is demounted.

The rubber band 8 has to be kept pulled above the engagement member 13 of the child seat in engagement with the anchor 14. Therefore, the point at which the rubber band 8 is sewn has to be determined so that the vertical center position of the rubber band 8 is located above the vertical center position of the engagement member 13 in the engagement state between the engagement member 13 of the child seat and the anchor 14. In other words, the above-described positioning may be performed so that the vertical center position of the rubber band 8 is located above the position of the anchor 14.

The larger the through hole of the insertion part 4 becomes, the easier the insertion can be made. However, the aforementioned condition may deteriorate the appearance design or seating feel when the child seat is demounted. It is therefore necessary to decide the size of the through hole in consideration with the above-described factors. In the embodiment, the through hole of the insertion part 4 is set approximately twice the height, and approximately twice the width of the engagement member 13 of the child seat, which is to be inserted.

As described above, the vehicle seat according to the embodiment is configured to form the anchor storage recess for storing the anchor to be engaged with the engagement member of the child seat in the pad constituting the seat, and to cover the anchor storage recess with the skin material having the slit. The slit has an inverse T-like shape.

The upper sides and the outer sides of the respective two skin materials are sewn to the peripheral part of the skin material to form the slit. The slit is constituted by the elastic member and the guide member. The guide member is sewn to the outer sides of the respective two skin materials. The two guide members are sewn to the two respective skin materials to constitute the guide member. The respective guide members movably hold the elastic member.

It is possible to provide the vehicle seat which allows improved child seat mountability and prevents deterioration in the appearance design when the child seat is demounted.

Second Embodiment

Figure 4A:
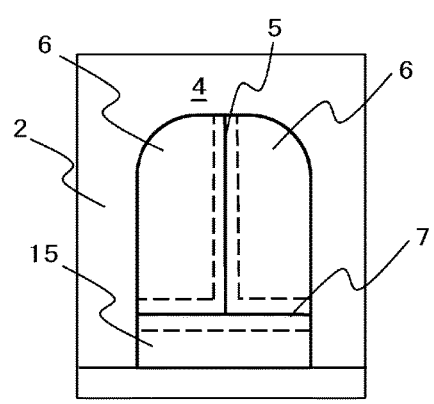
FIGS. 4A and 4B are an enlarged schematic view showing a peripheral part of the insertion part of the seat back according to a second embodiment.
Figure 4B:
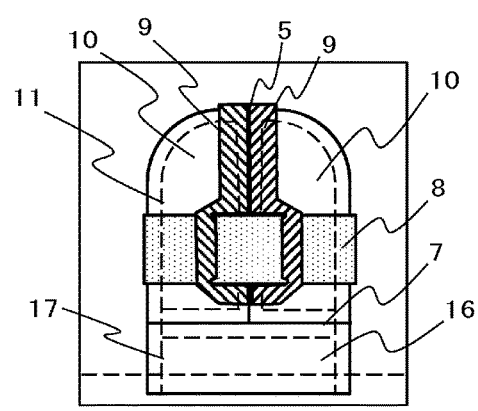

FIGS. 4A and 4B are an enlarged schematic view showing the peripheral part of the insertion part of the seat back. FIG. 4A is a surface view when seen from the surface of the seat back 2, and FIG. 4B is a back view when seen from the back surface of the skin of the seat back 2. Referring to FIGS. 4A and 4B, the similar structures to those as described in the first embodiment referring to FIGS. 2A and 2B are designated with the same codes, and explanations thereof, thus will be omitted. The structure shown in FIGS. 4A and 4B is different from the one shown in FIGS. 2A and 2 in that a skin material 15 for positioning in inserting the engagement part of the child seat is sewn to the peripheral part of the skin material at the lower end of the insertion part 4.

Referring to FIG. 4B, a code number 16 denotes a positioning wadding which is covered with the positioning skin material 15. The lower side and both sides of the positioning skin material 15 are sewn to the peripheral part of the skin material on the sewing part 17 together with the positioning wadding 16.

The upper end of the skin material 15 adjacent to the lower end 7 of the insertion part 4 is set as the positioning location for insertion of the engagement member 13 of the child seat so as to further improve the child seat mountability.

The present invention is not limited to the embodiments as described above, but includes various modifications. For example, the embodiments are described in detail for readily understanding of the present invention which is not necessarily limited to the one provided with all structures as described above. It is possible to replace a part of the structure of one embodiment with the structure of another embodiment. The one embodiment may be provided with an additional structure of another embodiment. It is further possible to add, remove, and replace the other structure to, from and with a part of the structure of the respective embodiments.

The invention claimed is:

1. A vehicle seat having an anchor storage recess formed in a pad, which constitutes the seat, for storing an anchor to be engaged with an engagement member attached to a child seat,
    wherein the anchor storage recess has an insertion part for accommodating insertion of the engagement member, the insertion part being covered by a pair of slit-forming skin materials that form a slit,
    wherein each slit-forming skin material has an upper side and an outer side, which are sewn to a peripheral part of another skin material, and inner and lower sides, which define the slit and are not sewn to the peripheral part of the another skin material, such that the slit can be opened, and
    wherein the slit has an inverted T-shape.

2. The vehicle seat according to claim 1, wherein:
    an elastic member is sewn to each of the outer sides of the respective slit-forming skin materials, and
    a pair of guide members are respectively sewn to the two slit-forming skin materials for movably holding the elastic member.

3. The vehicle seat according to claim 2, wherein each slit-forming skin material is sewn together with a respective wadding.

4. The vehicle seat according to claim 1, wherein:
    a positioning skin material is disposed at a lower part of the insertion part, and the positioning skin material has a lower side, a left side, and a right side sewn to the peripheral part of the another skin material.

5. The vehicle seat according to claim 4, wherein each slit-forming skin material is sewn together with a respective wadding.

6. The vehicle seat according to claim 1, wherein the slit has the inverted T-shape when viewed along a direction of insertion of the engagement member.

7. A vehicle seat comprising:
    a pad covered by a skin material;
    an anchor recess formed in the pad and constructed to store an anchor; and
    a pair of first skin material pieces that are adjacent to each other via respective inner edges and cover an opening to the anchor recess, a first portion of a slit being formed between the inner edges,
    wherein at least a portion of each first skin material piece is sewn to a surrounding portion of the skin material,
    lower edges of the first skin material pieces are not sewn to the surrounding portion of the skin material, a second portion of the slit being formed between the lower edges and the surrounding portion of the skin material, and
    the first and second portions are arranged such that the slit has an inverted T-shape.

8. The vehicle seat according to claim 7, further comprising:
    an elastic member extending between the first skin material pieces and being sewn to the first skin material pieces at opposite end portions; and
    a pair of guide members, each guide member coupling a middle portion of the elastic member to a corresponding one of the first skin material pieces.

9. The vehicle seat according to claim 8,
    wherein an engagement member is inserted through said slit into the anchor recess to engage with the anchor, the insertion displacing the first skin material pieces from the opening, and
    wherein the guide members and the elastic member are constructed such that the displaced first skin material pieces return to cover the opening after removal of the engagement member.

10. The vehicle seat according to claim 7, wherein each first skin material piece is sewn to a corresponding wadding.

11. The vehicle seat according to claim 7, further comprising a second skin material piece disposed adjacent to the lower edges of the first skin material pieces and covering a portion of said opening,
    wherein the second skin material piece is not sewn to the first skin material pieces.

12. The vehicle seat according to claim 11, wherein each first skin material piece and the second skin material piece is sewn to a corresponding wadding.

13. The vehicle seat according to claim 7, wherein the slit has the inverted T-shape when viewed along a direction of insertion of an engagement member to engage with the anchor.

* * * * *